United States Patent [19]

Onmori et al.

[11] Patent Number: 5,006,947

[45] Date of Patent: Apr. 9, 1991

[54] MAGNETIC TAPE CASSETTE HAVING IMPROVED DUST PROOFING

[75] Inventors: Shozo Onmori; Daisuke Takahashi; Kengo Oishi, all of Kanagawa, Japan

[73] Assignee: Fuji Photo Film Co., Ltd., Kanagawa, Japan

[21] Appl. No.: 549,524

[22] Filed: Jul. 5, 1990

Related U.S. Application Data

[62] Division of Ser. No. 318,866, Mar. 6, 1989.

[30] Foreign Application Priority Data

Mar. 11, 1988 [JP]  Japan .............................. 63-31697[U]
Mar. 25, 1988 [JP]  Japan .............................. 63-69850[U]
Mar. 30, 1988 [JP]  Japan .............................. 63-40982[U]

[51] Int. Cl.⁵ ......................................... G11B 23/087
[52] U.S. Cl. ................................................... 360/132
[58] Field of Search ......................... 360/132; 242/199

[56] References Cited

U.S. PATENT DOCUMENTS 4,886,220 12/1989 Oishi .................................. 360/132
4,903,915 2/1990 Iwahashi ........................... 360/132
4,918,558 4/1990 Igarashi et al. .................... 360/132

Primary Examiner—Robert S. Tupper
Attorney, Agent, or Firm—Sughrue, Mion, Zinn, Macpeak & Seas

[57] ABSTRACT

A magnetic tape cassette, such as a high performance video cassette, having a greatly improved dust-proofing function. In a first embodiment, operating portions of brake members which engage a brake release lever which is inserted into the cassette at the time of recording or reproduction to release the braking system of the cassette are formed in an inverted cup shape so as to close the hole through which the brake release lever is inserted and to contain the end of the brake release lever when inserted into the hole. In a second embodiment, separate engagement and abutment portions are provided for each brake portion so as to prevent inadvertent opening of the hole if the tape reels are moved during storage. In a third embodiment, the dust-blocking member takes the form of a slitted flexible sheet member covering the hole when the cassette is not in use.

2 Claims, 8 Drawing Sheets

MAGNETIC TAPE CASSETTE HAVING IMPROVED DUST PROOFING

This is a divisional of application No. 07/318,866 filed Mar. 6, 1989.

BACKGROUND OF THE INVENTION

The present invention relates to a magnetic tape cassette, and more particularly to a magnetic tape cassette of a type in which a loop of the magnetic tape is pulled out of the cassette for recording and playback.

Recently, very high recording densities have been achieved with magnetic tapes such as those used in VHS and β-type magnetic tape cassettes (video cassettes).

Generally, in such magnetic tape cassettes the magnetic tape is pulled out of an opening provided in the front of the cassette to effect recording and playback More specifically, such a cassette has a guard panel angularly movable to open and close the opening. The guard panel closes the opening when the cassette is stored or not in use to prevent dust and the like from entering the cassette and also to protect the tape when the cassette is manually handled. At the time of recording and playback, the guard panel is moved to expose the opening, and a tape pulling member provided in the recording/playback apparatus is moved to the rear side (the nonmagnetic side) of the tape to suitably pull the magnetic tape out of the cassette through the front opening.

For example, as disclosed in Japanese Laid-Open (Kokai) Utility Model Applications Nos. 55-57184 and 58-141485, tape winding bodies around which a magnetic tape is wound have respective flanges each having a toothed outer periphery, and a reel brake is provided which engages the toothed portions to prevent accidental angular movement of the tape winding bodies during storage of the cassette to thereby eliminate loosening or jamming of the wound tape. The braking action of the reel brake is released by a brake release lever insertable into the cassette through a hole formed in the bottom wall of the cassette.

Referring to the above reel brake in further detail, the most common type includes a three-piece construction having engaging members engageable with respective ones of the flanges of the tape winding bodies and one release member which divides the action of the brake release lever into two parts transmitted to the respective engaging members.

Also, there has been previously proposed a reel brake of a two-piece construction which can achieve similar braking effects. FIGS. 1 and 2 are views explanatory of the above reel brake of the two-piece construction.

The reel brake 43 is in the form of an assembly composed of two brake member 45 and 50 fitted on a brake support shaft 44 projecting from a lower half case 3 of the cassette in such a manner that these brake members are pivotable about the brake support shaft. Engaging pawls 47 and 52 as well as operating extensions 48 and 53 are integrally formed with body portions 46 and 51, respectively, of the two brake members through which the support shaft 44 extends. The engaging pawls extend toward respective flanges 11a and 11b for engagement therewith, and the operating extension extend toward a hole 8 in which a brake release lever 30 is adapted to be inserted. The brake members 45 and 50 are normally urged by a torsion spring 55 so that the engaging pawls 47 and 50 are held in engagement with the corresponding flanges, with the operating extensions 48 and 53 held against each other to close the hole 8.

For releasing the braking, the brake release lever 30 is pressed against the operating extension 48 and 53 from below to space them apart in right and left directions (in directions indicated by arrows C in FIG. 1), so that the brake members 45 and 50 are angularly moved to disengage the engaging pawls 47 and 52 from gear portions 12a and 12b of the flanges 11a and 11b, respectively.

The operating extension 48 and 53 normally close the hole 8 and therefore also perform a dust-proofing function to prevent dust and the like from entering the cassette. To enhance the dust-proofing effect, it is preferred that the operating extensions 48 and 53 have respective planar slide surfaces extending substantially along the bottom surface of the cassette. On the other hand, it is also preferred that at least that surface of each of the operating extensions 48 and 53 facing the cassette bottom surface be inclined in order to easily produce component forces to push apart the operating extensions to the right and left when the operating extensions are pressed upon by the brake release lever 30. In general, the greater the angle of inclination the smaller the resistance to the insertion of the brake release lever becomes to enable a smooth brake sliding movement.

However, as is clear from the drawings, the greater angle of inclination of the operating extensions 48 and 53, the poorer the dust-proofing as a result of the presence of a gap between those portions facing the hole 8.

Thus, the above reel brake construction has been found to be not entirely satisfactory in that it must perform two contradictory functions, that is, the dust-proofing function and the brake sliding function.

On the other hand, as the demand for higher recording densities and higher-quality magnetic tapes increases, it becomes ever more desirable to provide a reliable cassette construction. Moreover, in order to compensate for dimensional inaccuracies in various members of the recording/playback device (e.g., dimensional inaccuracies of shafts supporting the rotatable reels), the reels are allowed to slightly move along the bottom surface of the cassette. Therefore, in the reel brake 43 shown in FIG. 1, as is clear from the drawings, when the reels are moved toward the hole to press against the engaging pawls 47 and 52, respectively, the body portions 47a and 52a are rotated so that a gap is formed between the operating extensions 48 and 53 which are disposed to close the hole 8. This is also a problem from the viewpoint of dust-proofing.

This problem is often encountered with conventional VHS-type cassettes. More specifically, the closure device for closing the hole (i.e., the operating extensions in the above example) is not directly urged in its closing direction, for example, by a spring, but indirectly urged in a direction to close the hole by the brake members having the engaging pawls. Therefore, when the positions of the brake members are changed in accordance with the movements of the reels, the above closure device is also influenced by such position change, so that a gap is formed between the closure device and the hole through which the insertion member is to be passed.

SUMMARY OF THE INVENTION

The present invention has been made in view of the above problems.

A specific object of the invention is thus to provide a magnetic tape cassette having a reduced number of parts and hence a low manufacturing cost and which is better capable of simultaneously attaining an improved sliding ability of brake members and an improved dust-proofing effect, to thereby better meet high performance requirements.

Another object of the invention is to provide a magnetic tape cassette in which the hole formed in the bottom wall of the cassette is completely closed during storage to thereby achieve a high performance of the cassette.

The above and other objects are achieved by a magnetic tape cassette housing a pair of tape winding bodies around which a magnetic tape is wound, the magnetic tape being pulled exteriorly of the cassette so as to effect recording and playback, and including a reel brake for preventing angular movement of the tape winding bodies in the form of an assembly of two brake members which includes respective engaging pawls engageable with corresponding gear portions formed on the flanges of the tape winding bodies, and respective operating portions with which a brake release lever insertable into the cassette is adapted to be brought into sliding contact so as to move the operating portions apart from each other to disengage the engaging pawls from the respective gear portions. The engaging pawls as well as the operating portions are formed on body portions of the two brake members, and the body portions of the brake members are fitted on brake support shafts projecting from the bottom surface of the cassette so that the brake members are angularly movable. The operating portions have a shape capable of substantially containing the brake release lever. Further, inner wall surfaces of the operating portions are inclined toward their closed positions in the direction of insertion of the brake release lever.

The objects of the invention are also achieved by a magnetic tape cassette housing a pair of tape winding bodies around which a magnetic tape is wound, the magnetic tape being pulled exteriorly of the cassette so as to effect recording and playback, and which includes a reel brake for preventing angular movement of the tape winding bodies having a pair of engaging pawls each pivotally supported at one end thereof and having a free end urged in a direction to engage a gear portion formed on a flange of a respective one of the tape winding bodies, and a pair of rotatable body portions each having an abutment portion and an operating portion, both of which extend from the rotatable body portion radially of the body portion. The abutment portion is engageable with a respective one of the engaging pawls intermediate the length of the engaging pawl so as to move the engaging pawl out of engagement with the gear portion. A brake release insertion member is insertable into the cassette through a hole formed in a wall of the cassette so as to be engaged with each of the operating portions to move the abutment portion. The rotatable body portions are urged in such directions as to hold the operating portions in contact with each other to close the hole. Each abutment portion urges a respective one of the engaging pawls to move the same out of engagement with the mating gear portion when the operating portions are moved away from each other, but the operating portions are not moved by movement of the engaging pawls.

Further, in accordance with the present invention there is provided a magnetic tape cassette having a light-emitting source incorporated in an insertion member serving to release a braking operation, so that the cassette can be used in a recording/playback device of the type incorporating a tape detection means for detecting light from the light-emitting source to detect tape ends (start end and terminal end). In the magnetic cassette of such a construction, another separate hole used for the tape detection means can be omitted, and therefore the dust-proofing effect is enhanced accordingly to provide a highly reliable cassette.

The above objects have still further been achieved by a magnetic tape cassette housing a pair of tape winding bodies around which a magnetic tape is wound, the cassette including a reel brake for preventing angular movement of the tape winding bodies. A hole is formed through a wall of the cassette through which a brake release lever for releasing the braking operation of the reel brake can pass. The hole is closed by a flexible dust-proofing member which is divided in such a manner as to allow the brake release lever to pass therethrough.

DESCRIPTION OF THE PREFERRED EMBODIMENTS

Figure 1:
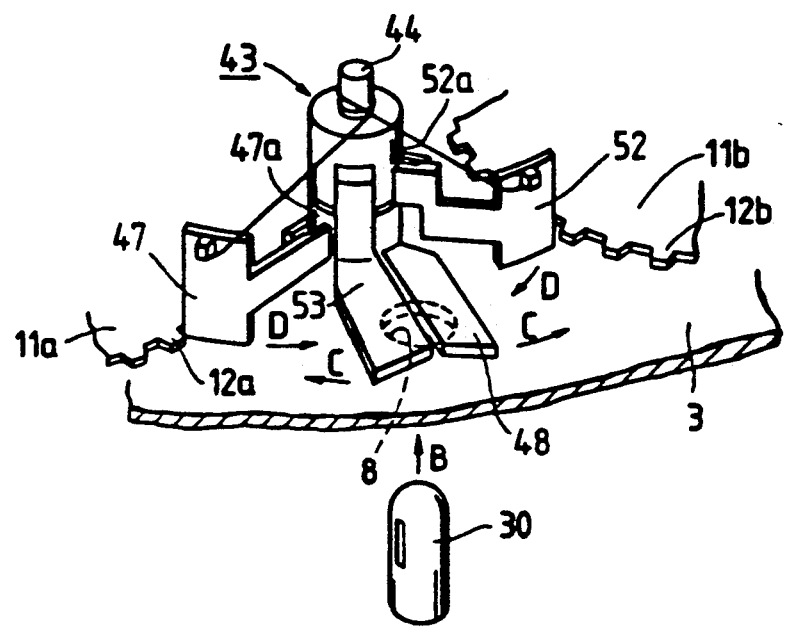
FIG. 1 is a perspective view of a conventional reel and brake.

Preferred embodiments of the invention illustrated in the drawings will now be described in detail.

Figure 3:
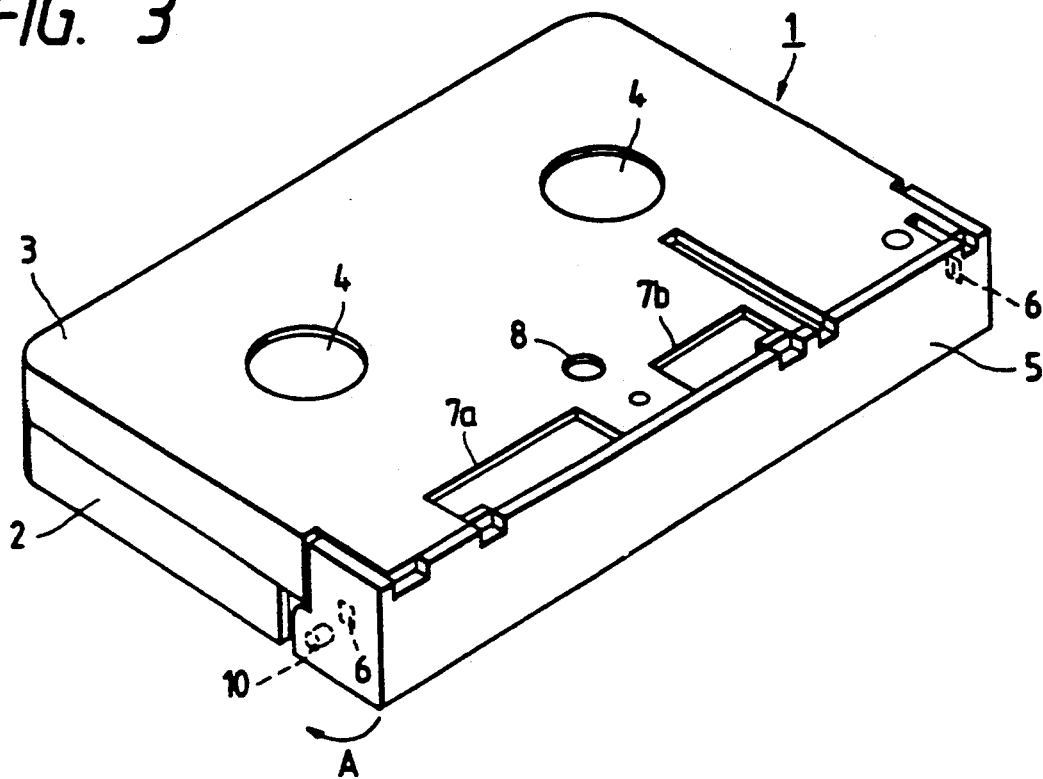
FIG. 3 is a perspective view of a first embodiment of a magnetic tape cassette of the present invention.
Figure 4:
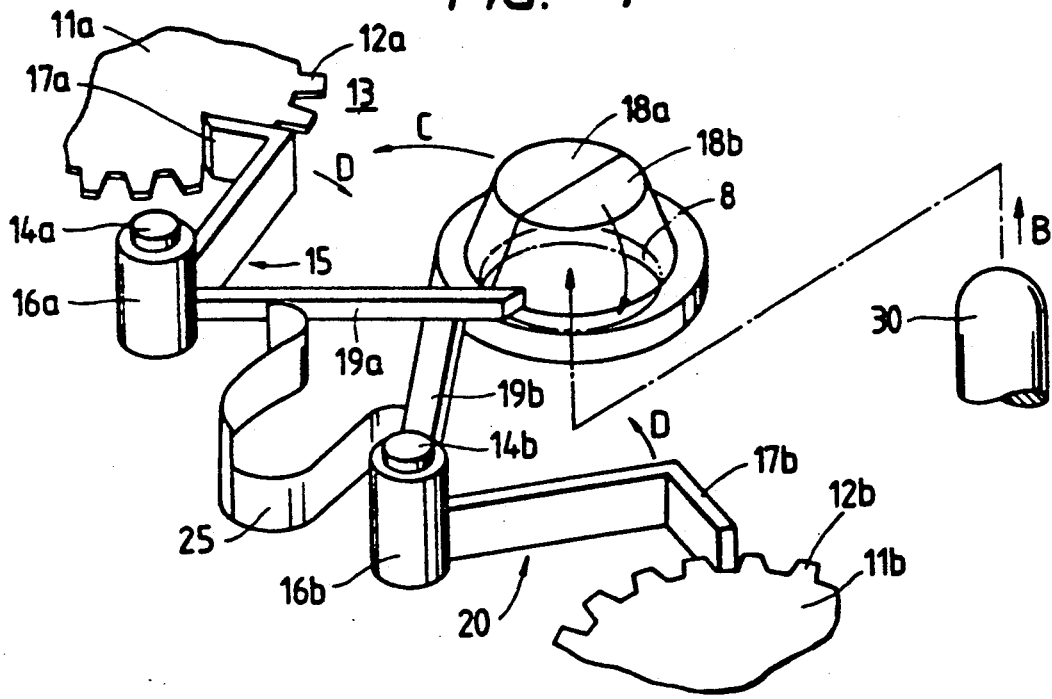
FIG. 4 is a perspective view of a reel brake incorporated in the magnetic tape cassette of FIG. 3.

FIG. 3 is a perspective view of a magnetic tape cassette 1 embodying the present invention, showing a bottom view thereof. FIG. 4 is a perspective view of a reel brake 13 incorporated in the magnetic tape cassette 1 of FIG. 3. FIGS. 3 and 4 are cross-sectional views of the reel brake 13 illustrating the operation of those members.

The magnetic tape cassette 1 shown in FIG. 3 includes a cassette case composed of upper and lower half cases 2 and 3, the cassette case rotatably housing a pair of tape winding (reels) around which a magnetic tape is wound. This magnetic tape cassette is similar generally in construction to a conventional video tape cassette such as a VHS-type cassette, but greatly differs therefrom in the reel brake construction.

The reel brake 13 shown in FIG. 4 is provided generally centrally of the cassette case and closer to the front side thereof. A brake release lever 30 is introduced into the cassette case through a hole 8 (FIG. 3) formed through the lower half case 3, which is suitably operated to release the engagement of the reel brake with gear portions 12a and 12b of lower reel flanges 11a and 11b.

The reel brake 13 is in the form of an assembly including first and second brake members 15 and 20 angularly movable about respective brake support shafts 14a and 14b which project from the lower half case 3 near the hole 8 and are spaced from each other in right and left directions with respect to the cassette case. The two brake members 15 and 20 include respective cylindrical body portions 16a and 16b through which the brake support shafts 14a and 14b, respectively, extend. The brake members also include respective engaging pawls 17a and 17b extending from the body portions 16a and 16b toward the gear portions 12a and 12b, and respective operating portions 18a and 18b integrally formed on distal ends of rods 19a and 19b extending from the body portions 16a and 16b toward the hole 8. A leaf spring 25 urging the two brake members 15 and 20 in their closed directions is engaged with the rods 19a and 19b.

With this arrangement, the engaging pawls 17a and 17b of the brake members 15 and 20 are normally held in engagement with the gear portions 12a and 12b, respectively. Although not shown in the drawings, the leaf springs 25 are held in position by ribs or the like formed on the inner surface of the cassette.

When the engaging pawls 17a and 17b are held in engagement with the gear portions 12a and 12b, respectively, the two operating portions 18a and 18b are held in contact with each other to close the hole 8.

The operating portions 18a and 18b, when engaged with each other to close the hole 8, jointly assume the shape of an inverted cup, which is dimensioned to receive the distal end of the brake release lever 30 when the latter is inserted into the cassette.

Figure 5:
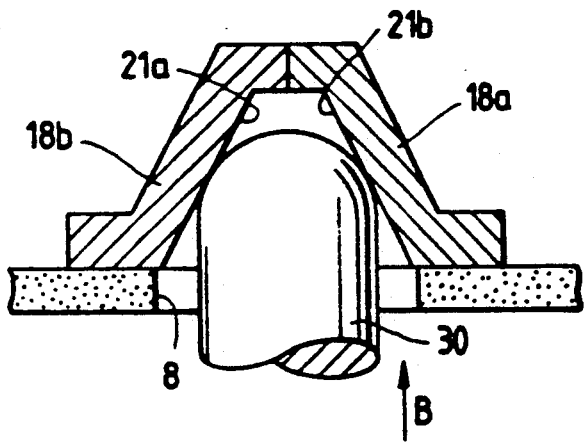
FIGS. 5 and 6 are cross-sectional views of operating portions of the reel brake of FIG. 4.
Figure 6:
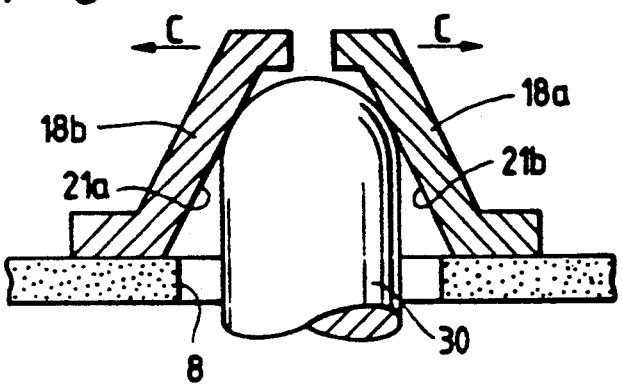

As shown in FIGS. 5 and 6, the two operating portions 18a and 18b have respective inner wall surfaces 21a and 21b which are inclined toward their closed positions in the direction of insertion of the brake release lever 30. Further, the peripheral edge of each operating portion 18a, 18b defining the open end thereof is in uniform contact with the bottom surface of the cassette to completely prevent dust and the like from entering the cassette through the hole 8.

The shape of the engaging pawls 17a and 17b is not particularly limited so long as they are of a shape capable of meshingly engaging the respective gear portions 12a and 12b.

For example, as shown in the drawings, the pawls can have a hook-like cross-section in a horizontal plane of the cassette and can be in the form of a plate having a width dimension in the direction of the thickness of the cassette. Also, the shape of the operating portions 18a and 18b is not particularly limited. For example, the operating portions can be in the shape of an inverted truncated cone, as in the above-described embodiment. Regardless of the shape of the operating portions, the operating portions 18a and 18b can completely close the hole 8 and can substantially contain the brake release lever 30, with the inner wall surface 21 inclined toward the closed position in the direction of insertion of the brake release lever 30. The inclined inner wall surface is not limited to a rectilinear cross-section and can be convexly or concavely curved in cross-section.

The recording/playback device into which the magnetic tape cassette 1 is to be loaded includes the brake release lever 30 mounted at a position corresponding to the hole 8.

When the magnetic tape cassette 1 is loaded into the recording/playback device, a bucket holding the magnetic tape cassette 1 is moved, for example, downward. Upon this movement, the brake release lever 30 penetrates the cassette through the hole 8 as indicated by an arrow B in FIG. 5. At this time, the distal end of this lever is first brought into contact with the inner wall surface 21, and then the lever 30 slidingly moves along the inner wall surface 21 with a reduced resistance to the insertion because of the inclination of the inner wall surface 21. Thus, the lever 30 urges the operating portions 18a and 18b apart against the bias of the leaf spring 25 in the directions indicated by arrows C in FIG. 6. As a result, the body portions 16a and 16b are angularly moved so that the two engaging pawls 17a and 17b are moved toward each other in the directions indicated by arrows D in FIG. 4 to disengage from the respective gear portions 12a and 12b, thus releasing the engagement thereof with the gear portions 12a and 12b. As a result, the reels around which the magnetic tape is wound are made freely rotatable. As the bucket is moved downward, a guard panel 5 is angularly moved in its opening direction, that is, in the direction of an arrow A in FIG. 3, about pivot pins 10 connected to opposite end walls of the guard panel. At this time also, a tape pulling member is brought into mouth portions 7a and 7b formed in the bottom of the cassette, and reel shafts are inserted into respective reel shaft holes 4 and 4 for rotationally driving the reels.

In this embodiment, the brake release lever 3 is disposed closer to the front side of the cassette, and therefore in addition to the function of releasing the locking operation of the reel brake 13, this lever can additionally be used for detecting the tape ends. In such a case, the magnetic tape and leader tapes, which are connected to the opposite ends of the magnetic tape and which differ from the magnetic tape in light transmittance, are detected using light-detecting elements. In accordance with the detection signals so produced, the running of the magnetic tape can be suitably controlled as in the conventional system. For example, a light-emitting element can be mounted on the distal end of the brake release lever so as to emit light laterally of the cassette, and the light-detecting elements disposed exteriorly of the cassette detect the rays of light emitted from the light-emitting element and passing through the path of travel of the tape.

The above-mentioned dual-purpose construction, having the reel brake and the detection portions in combination, obviates the need to provide two holes for receiving the brake release lever and a light-emitting source, as is the case with the conventional VHS cassette. This is desirable from the viewpoint of dust-proofing.

Figure 7:
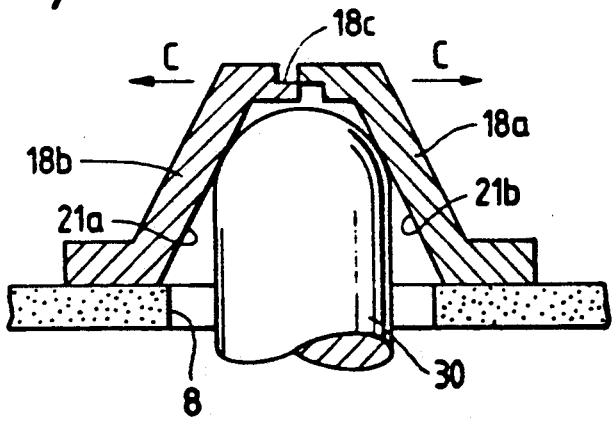
FIG. 7 is a cross-sectional view of modified operating portions.

The present invention is not restricted to the above-described embodiment. For example, as shown in FIG. 7, stepped sections 18c may be formed on the mating edges of the operating portions 18a and 18b to further enhance the dust-proofing effect. Further, the present invention is applicable to conventional VHS cassettes.

As described above, according to the present invention, the operating portions with which the brake release lever for releasing the braking of the reels is adapted to be brought into contact have inclined surfaces which can easily produce component forces in the transverse direction of the cassette with respect to the point where the brake release lever acts. These operating portions also can completely close the hole into which the above lever is inserted. Therefore, the invention improves the operability of the reel brake and the dust-proofing effect.

Figure 8:
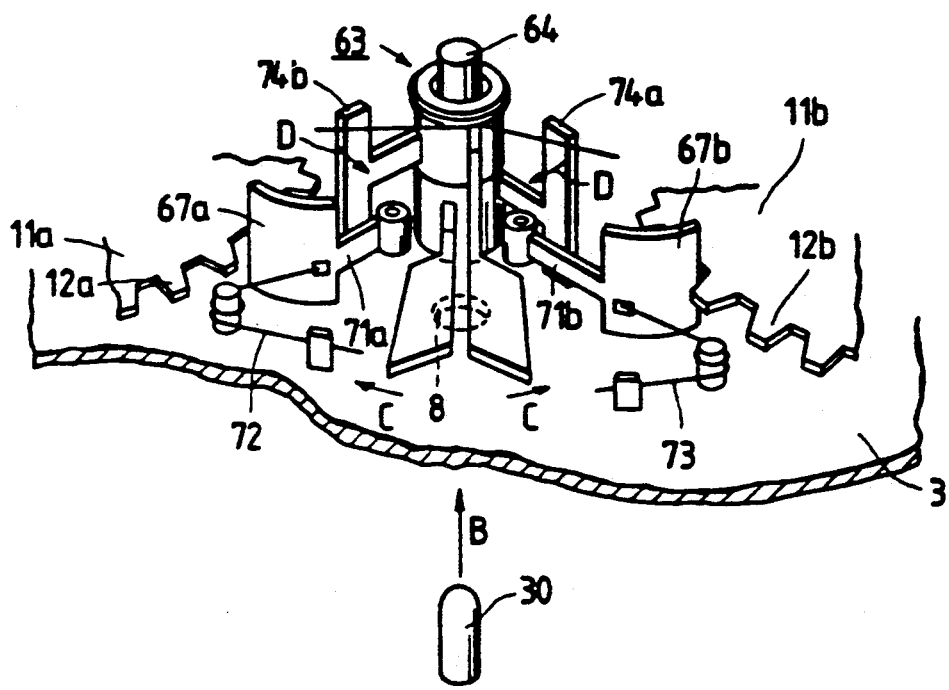
FIG. 8 is a perspective view of another embodiment of a reel brake of the invention.

In accordance with another embodiment of the invention, a magnetic tape cassette is provided having a reel brake 63, as shown in FIG. 8, mounted generally centrally of the cassette case and closer to the front side thereof. An insertion member 30 is introduced into the cassette case through the hole 8 formed in the lower half case 3 and suitably operated to release the engagement of the reel brake with the gear portions 12a and 12b of the lower flanges 11a and 11b of the reels, as in the above-described embodiments.

The reel brake 63 has first and second brake members 65 and 70 angularly movable about a first support shaft 64 disposed near the hole 8 through the lower half case 3 and projecting at a midpoint between the two reels, and engaging pawls 67a and 67b angularly movable respectively about two second support shafts 69a and 69b disposed near the first support shaft 64 symmetrically with respect thereto.

The two brake members 65 and 70 have respective rotatable cylindrical body portions 66a and 66b through which the first support shaft 64 extends, and the body portions have respective abutment portions 74a and 74b extending radially from the body portions 66a and 66b, and respective operating portions 68a and 68b extending therefrom toward the hole 8.

Figure 9:
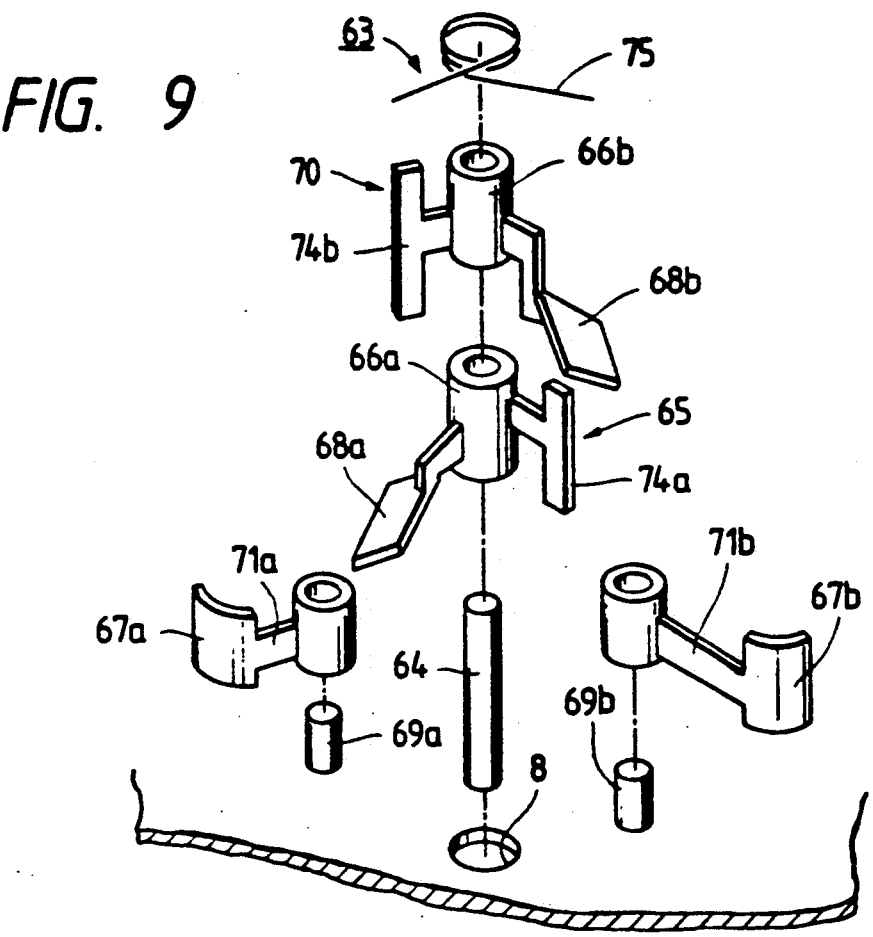
FIG. 9 is an exploded perspective view of the reel brake of FIG. 8.

Each abutment portion 74a, 74b has a generally T-shaped portion extending from the body portion 66a, 66b, the T-shaped portion having a distal bar-like portion extending in the direction of thickness of the cassette. As shown in FIG. 9, the first brake member 65 and the second brake member 70 are mounted on the first support shaft 64 in the stated order, and a torsion spring 75 is mounted on either the body portion 66b of the second brake member 70 or the support shaft 64. The torsion spring 75 is arranged so that the opposite ends thereof are engaged with the upper portions of the bar-like parts of the abutment portions 74a and 74b. Under the bias of the torsion spring 75, the operating portions 78a and 78b of the two brake members 65 and 70 are held in contact with each other to close the hole 8. When the operating portions 78a and 78b are in the position to close the hole 8, it is preferred that the abutment portions 74a and 74b not be engaged with the engaging pawls 67a and 67b. This arrangement ensures positive engagement of each of the engaging pawls 67a, 67b with the gear portion 12a, 12b, as will be more fully described below.

The shape of the operating portions 78a and 78b is not particularly limited. For example, as shown in FIGS. 8 and 9, each operating portion may be in the form of a plate extending along the bottom surface of the cassette. Preferably, those surfaces of the operating portions facing the bottom surface of the cassette are inclined so as to easily produce component forces to move the operating portions apart in right and left directions when the insertion member 30 is brought into engagement with the operating portions.

Each engaging pawls 67a, 67b has an arm 71a, 71b supported by the second support shaft 79a, 79b and having a distal end engageable with the gear portion 12a, 12b. A torsion spring 72, 73 is engaged with the distal end of each arm to normally urge the engaging pawl 67a, 67b toward its mating gear portion. The arm 71a, 71b of the engaging pawl 67a, 67b is urged only in one direction (i.e., from the side of the gear portion) by the lower portion of the abutment portion 74a, 74b intermediate the opposite ends of the arm so that the distal end of the arm is disengaged from its mating gear portion 12a, 12b.

The shape of the distal end of the arm 71a, 71b is not particularly limited so long as it can be meshingly engaged with the gear portion 12a, 12b. For example, it can be in the form of a plate extending in the direction of the thickness of the cassette.

In accordance with the present invention, the reel brake 13 is of a double-brake construction, including the abutment portions 74a and 74b movable in accordance with the movements of the operating portion 68a and 68b, respectively, and the engaging pawls 67a and 67b provided independently of the abutment portions 74a and 74b. More specifically, the urging force produced by the movement of the operating portions 68a and 68b upon insertion of the insertion member 30 acts on the engaging pawls 67a and 67b through the abutment portions 74a and 74b to thereby release the braking operation. On the other hand, if the reels are accidentally moved to the right or left with respect to the cassette case such as during storage of the cassette, the engaging pawls 67a and 67b, which are in locking engagement with the gear portions 12a and 12b, move in accordance with the movements of the respective reels. The movements of the reels are transmitted to the engaging pawls 67a and 67b but are not transmitted to the abutment portions 74a and 74b and the operating portions 68a and 68b.

The recording/playback device into which the magnetic tape cassette 1 is to be loaded has the rod-like insertion member 30 at a position corresponding to the hole 8 of the magnetic tape cassette 1. The insertion member 30 has a light-emitting source, for example, a light-emitting diode, incorporated in the portion thereof which is inserted into the cassette, the light-emitting source emitting light in a horizontal plane in generally right and left directions with respect to the cassette. The distal end of the insertion member is generally pointed.

When the magnetic tape cassette 1 is loaded into the recording/playback device, a bucket holding the magnetic tape cassette is moved, for example, downward. Upon this movement, the insertion member 30 penetrates the cassette through the hole 8, as indicated by an arrow B in FIG. 8. At this time, the pointed end of the insertion member 30 first begins to urge the operating portions 68a and 68b apart in directions of arrows C, and a further movement of the insertion member causes the operating portions 68a and 678b to move away from each other against the bias of the torsion spring 75 by a distance corresponding to the diameter of the insertion member 30. Therefore, the body portions 66a and 66b of the two brake members 65 and 70 are rotated relative to each other in directions of arrows D so that the two abutment portions 74a and 74b urge the central portions of the engaging pawls 67a and 67b, respectively, so as to disengage the distal ends of the engaging pawls from the gear portions 12a and 12b, respectively. As a result, the engagement of the reels around which the magnetic tape is wound with the reel brake 63 is released and the reels are free to rotate.

When the reels are moved in directions away from the engaging pawls 67a and 67b, the engaging pawls 67a and 67b can move in accordance with the movements of the respective reels if the abutment portions 74a and 74b are spaced a suitable distance from the respective arms 71a and 71b, that is, held out of contact therewith. This ensures positive locking of the reels. As in the previously described embodiments, a light source can be provided in the insertion member together with appropriately positioned light-detecting elements to detect the ends of the magnetic tape.

Figure 10:
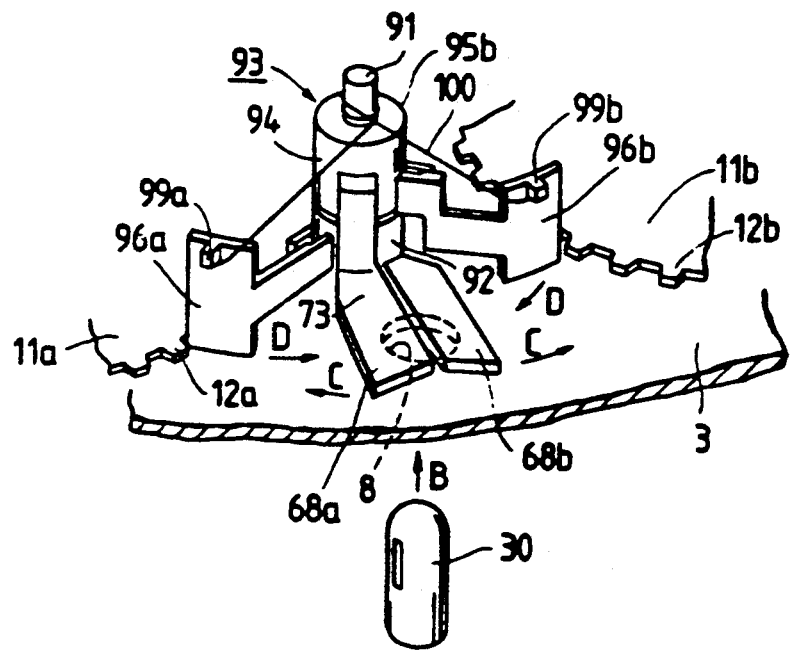
FIG. 10 is a perspective view of still another embodiment of a reel brake of the invention.

FIG. 10 shows another embodiment of a reel brake of the invention.

Those parts identical to those employed in the previously described embodiments are denoted by the same reference numerals, and a further detailed explanation thereof will be omitted.

This reel brake 93 in this embodiment has first and second brake members 92 and 94 angularly movable about a support shaft 91 projecting from the lower half case 3. The two brake members 92 and 94 are composed of respective rotatable cylindrical body portions 95a and 95b through which the support shaft 91 extends (see FIG. 11). The brake members also include respective engaging pawls 96a and 96b extending from respective body portions 95a and 95b toward the gear portions 12a and 12b, respectively, and operating portions extending from respective body portions toward the hole 8.

In this embodiment, unlike the reel brake 63 shown in FIGS. 8 and 9, the engaging pawls 96a and 96b are formed on the body portions 95a and 95b, respectively.

Figure 11:
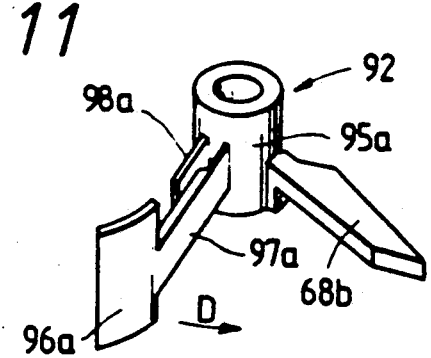
FIG. 11 is a perspective view of a brake member of the reel brake of FIG. 10.

Referring to the brake member 92 in further detail with reference to FIG. 11, an arm 97a of the engaging pawl 95a extending from the body portion 95a is reduced in thickness at a proximal portion thereof to provide a hinge portion so as to allow the arm 97a to be angularly movable in right and left directions with respect to the cassette.

However, the engaging pawls 96a can be moved only in one direction (i.e., in the direction of an arrow D) in accordance with the movement of the operating portion 68b due to the provision of an abutment support portion 98a fixedly formed on the body portion 95a adjacent the engaging pawl 96a. More specifically, the abutment portion 98a is disposed so as to engage the arm 97a at a point intermediate the above thinned portion and the distal end of the arm 97a to thereby urge the arm away from the gear portion 12a when the engaging pawl 96a is disengaged from the gear portion 12a.

The second brake member 94 is of a similar construction.

Referring again to FIG. 10, the engaging pawls 96a and 96b are supported by the support shaft 91 and are normally urged toward their mating gear portions by a torsion spring 100 having opposite ends engaged with spring retainers 99a and 99b formed on the respective engaging pawls 96a and 96b. Therefore, under the bias of the torsion spring 100, the engaging pawl 96a of the first brake member 92 is engaged with the gear portion 12a while the engaging pawl 96b of the second brake member 94 is engaged with the gear portion 12b. Thus, the operating portions 98a and 98b are held in contact with each other to close the hole 8.

Therefore, when the body portions 95a and 95b are rotated upon insertion of the insertion member 30, the abutment portion 98, which serves to prevent the folding of the engaging pawl 96, is brought into abutment with the arm 97 of the engaging pawl 96 so that the engaging pawl 96 is suitably disengaged from the gear portion 12.

Even if the reels are radially displaced by a distance corresponding to the amount of allowable play thereof to urge the engaging pawl 96a and 96b in such a manner as to cause rotation of their respective body portions 95a and 95b in directions so as to move the operating portions 98a and 98b away from each other, the body portions 45a and 45b will not be rotated because the engaging pawls 96a and 96b are folded at their proximal portions to be angularly moved. Therefore, the operating portions 98a and 98b remain stationary and hence do not open the hole 8.

Also, if the reels are displaced in directions away from the hole 8, the operating portions 68a and 68b will not be moved at all and will not open the hole 8 since the engaging pawls 96a and 96b are urged into normal engagement with the gear portions 12a and 12b so that they can move in accordance with the movements of the reels independently of their respective body portions 95a and 95b.

As described above, according to this embodiment of the present invention, the reel brake is of a double-action construction such that the brake members, which are operable upon insertion of the brake release insertion member, and the angularly movable engaging pawls, which are engageable with the gear portions of the reels, are moved together in the brake releasing directions when the brake members are moved to release the braking. Other than such times, the brake members and the engaging pawls are not moved together. Therefore, should the engaging pawls be moved in accordance with accidental movements of the reels, the movement of the engaging pawls is not transmitted to the operating portions. Therefore the operating portions will not be displaced if the reels are jostled, and therefore the operating portions are positively retained in position to close the hole during storage of the cassette.

Particularly, the incorporation of the tape detection arrangement into the brake release insertion member enables a smaller number of holes in the cassette as compared with an arrangement having a separate tape detection device. This enhances the dust-proofing effect accordingly, thereby providing a highly reliable cassette.

Figure 12:
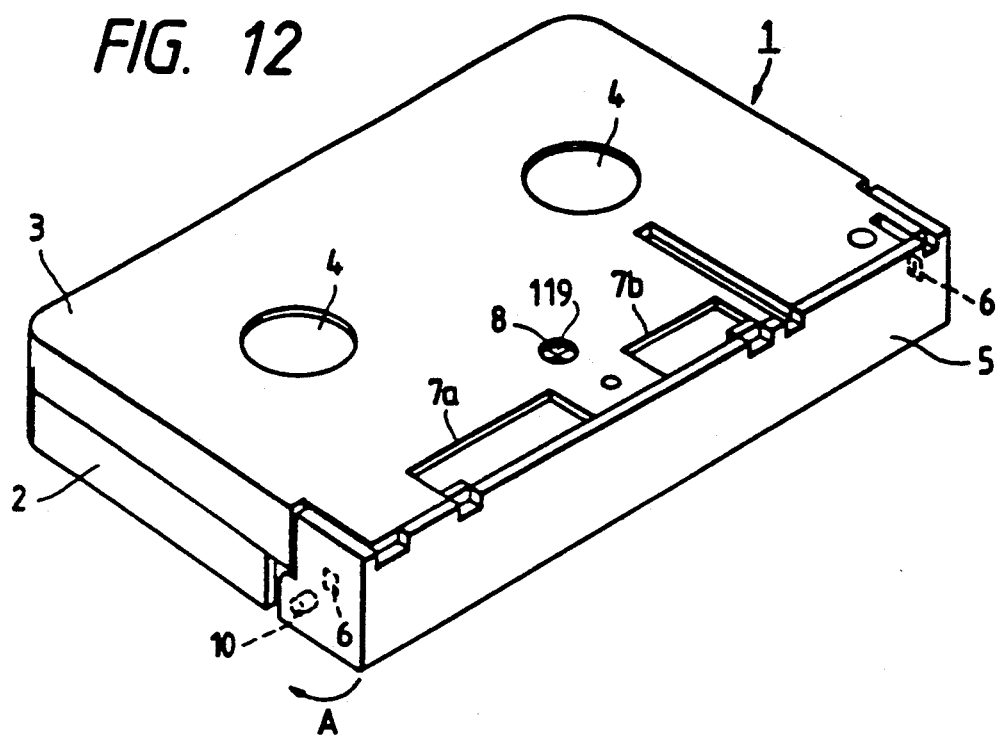
FIG. 12 is a perspective view of another preferred embodiment of a magnetic tape cassette of the present invention.
Figure 13:
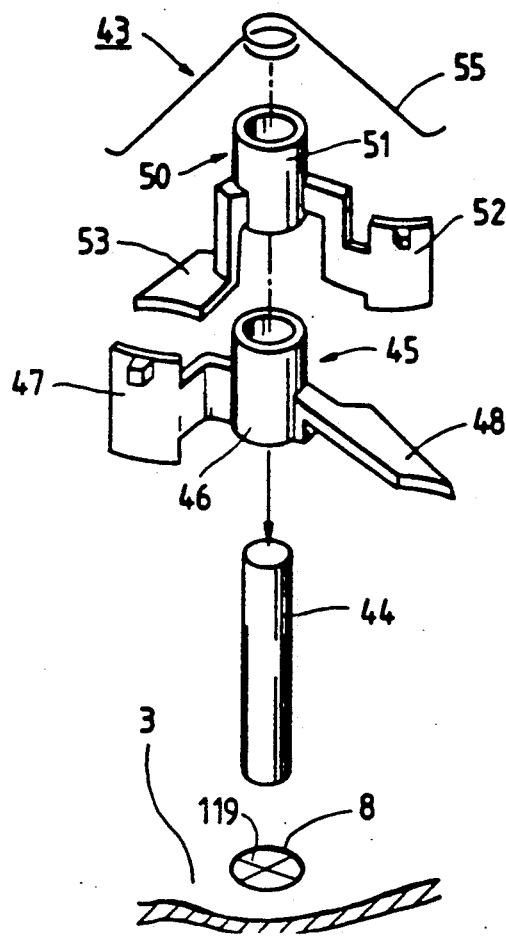
FIG. 13 is an exploded perspective view of a reel brake incorporated in the magnetic tape cassette of FIG. 12.
Figure 14:
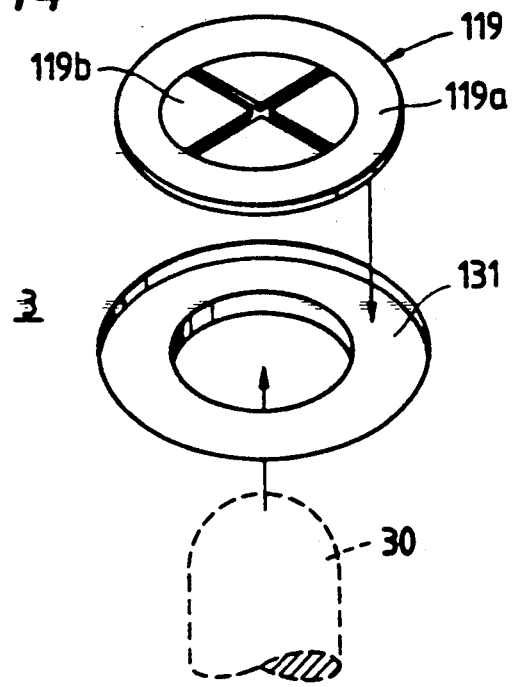
FIG. 14 is a perspective view of a sheet-like dust-blocking member.
Figure 15:
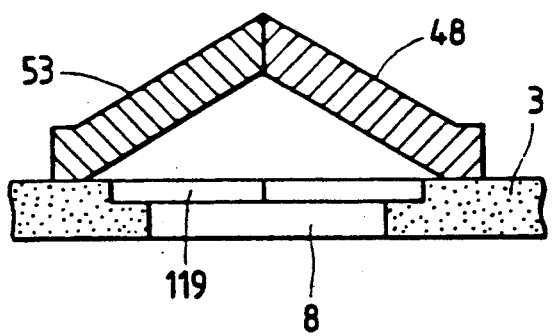
FIGS. 15 to 17 are cross-sectional views of important portions of the cassette showing the operation of the dust-blocking member.
Figure 16:
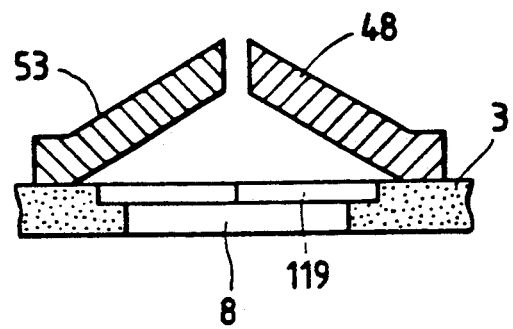
Figure 17:
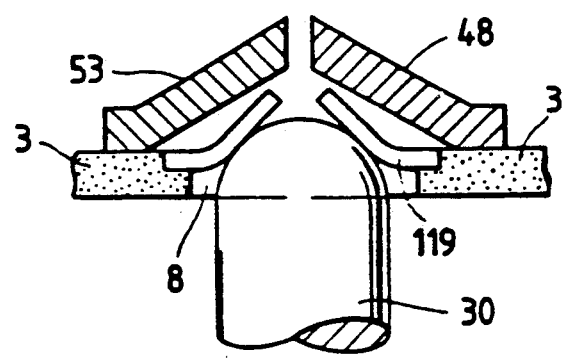

FIG. 12 is a perspective view of a magnetic tape cassette 1 constructed in accordance with still another embodiment of the present invention, showing a bottom side thereof. FIG. 13 is an exploded perspective view of a reel brake 43 incorporated in the magnetic tape cassette 1 of FIG. 12. FIG. 14 is a perspective view of a sheet-like dust-blocking member 119 constituting a specific feature of this embodiment of the present invention. FIGS. 15 to 17 are cross-sectional views of important portions of the cassette illustrating the operation of the reel brake 43 and the dust-blocking member 119.

Figure 2:
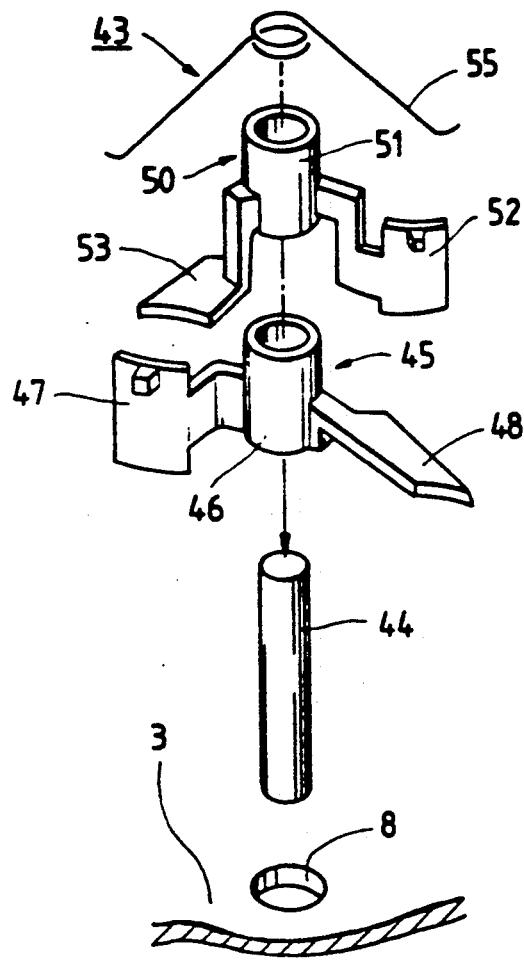
FIG. 2 is an exploded perspective view of the conventional reel brake shown in FIG. 1.

The magnetic tape cassette 1 shown in FIGS. 12 and 13 is of the same construction as the cassette shown in FIGS. 1 and 2, except for the provision in the instant embodiment of the dust-blocking member 119 in the hole 8.

The closed condition of the hole 8 is always maintained by the dust-blocking member even when the reels are moved toward each other and toward the hole 8 to urge the respective engaging pawls 47 and 52 engaged therewith to rotate the body portions 46 and 51 so that the operating extensions 48 and 53 are moved away from each other to form a gap therebetween to slightly open the hole.

More specifically, as shown in FIG. 14, the hole 8 for the passage of the brake release lever 30 therethrough is formed in a slightly-recessed or stepped portion 131 of the bottom surface of the lower half case 3 internally of the cassette so that the peripheral marginal portion around the hole 8 is recessed. The dust-blocking member 119, which is flexible and has slits, is fitted in and bonded to the stepped portion 131.

When the dust-blocking member 119 is mounted in position, the inner bottom surface of the cassette becomes planar.

The peripheral edge portion 119a of the dust-blocking member 119 is mated with and bonded to the stepped portion 131 to fixedly secure the dust-blocking member to the lower half case 3. The dust-blocking member 119 is of a substantially disc-shape having slits extending to the center thereof so that a plurality of (four) angularly-movable sections 119b are provided.

The dust-blocking member 119 can be made, for example, of a material having a low coefficient of friction, such as polyethylene terephthalate, so that the dust-blocking member will not retard the passage of the brake release lever therethrough. FIG. 15 shows the condition in which the cassette is stored. In this condition, the operating extensions 48 and 53 of the reel brake 43 are held in contact with each other, and the dust-blocking member 119 closes the hole 8.

FIG. 16 shows the condition in which the reels are moved during the above-mentioned storage of the cassette to form a gap between the operating extensions 48 and 53. In this case, however, the hole 8 is kept closed by the dust-blocking member 119, thereby maintaining the closed condition.

FIG. 17 shows the condition in which the brake release lever 30 begins to penetrate the cassette from below. At this time, this lever is first brought into engagement with the angularly movable sections 119b to urge them apart. Then, the brake release lever 30 is further moved into engagement with the operating extension 48 and 53 to urge them apart in right and left directions (the directions of arrows C) as mentioned above, thereby releasing the braking operation.

When the brake release lever 30 is retracted from the cassette, the operating extensions 48 and 53 with which the brake release lever 30 is held in sliding contact are returned to their respective closed positions under the bias of the torsion spring 55, and the dust-blocking member 19 is returned to its closed condition because of its elastic properties.

It is preferred that at least those surfaces of the operating extensions 48 and 53 facing the bottom surface of the cassette be inclined, as shown in the drawings, so as to easily produce component forces to move the operating extension 48 and 53 in right and left directions upon pressing engagement of the brake release lever 30 therewith. In the conventional construction, as described above, the hole can be opened when the reels are moved during storage. With this embodiment of the present invention, however, by virtue of the provision of the dust-blocking member 119, such opening of the hole can be suitably prevented to maintain complete closure of the hole, thereby preventing dust and the like from entering the cassette through the hole 8.

Figure 18:
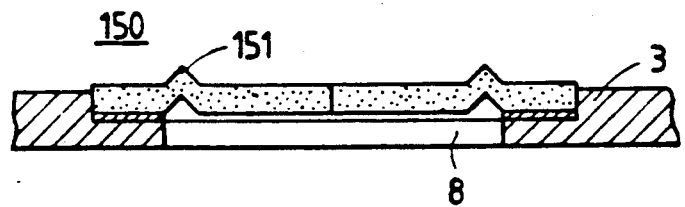
FIG. 18 is a cross-sectional view of a modified dust-blocking member.
Figure 19:
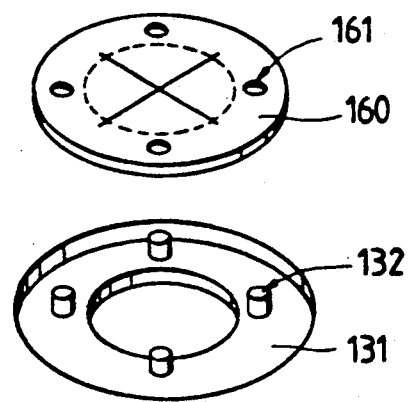
FIG. 19 is a cross-sectional view of another modified dust-blocking member.

FIGS. 18 and 19 show modified examples of the dust-blocking member 119.

More specifically, the dust-blocking member 150 shown in FIG. 18 has a rib 151 at the angularly movable proximal portion thereof in order to prevent fatigue due to repeated angular movements of the dust-blocking member 150. A recess is formed in the face of the dust-blocking member opposite to the face on which the rib 151 is formed, to thereby provide a hinged portion resistant to fatigue. The dust-blocking member 160 of FIG. 19 is secured to the cassette by pressing deformation instead of using an adhesive, a double-sided adhesive tape, or the like. More specifically, deformable lugs 132 are formed on the stepped portion 131 around the hole formed through the dust-blocking member 160 at portions thereof corresponding to the lugs. The lugs 132 are passed through the respective ones of the apertures 161, and then deformed by pressing to fixedly secure the dust-blocking member 160 to the cassette.

In the above embodiments, although the slits are provided in the dust-blocking member to divide it into four sections, the invention is not restricted to such constructions. The number of the slits can be suitably changed. Also, it is not always necessary for the dust-blocking member to have a one-piece construction. For example, it may be composed of a plurality of sheets stacked one upon another to enhance the dust-blocking effect.

The present invention is not restricted to the above embodiments and is extensively applicable to any type of magnetic tape cassette having the above-mentioned hole 8.

As described above, according to the present invention, the hole for the passage of the brake release lever is closed by the flexible dust-blocking member which allows the brake release lever to pass therethrough. Therefore, the dust-blocking effect in not reduced by the reel brake, no matter what its construction.

What is claimed is:

1. A magnetic tape cassette housing a pair of tape winding bodies around which a magnetic tape is wound, the magnetic tape being pulled exteriorly of the cassette for recording and playback, comprising: a reel brake for preventing angular movement of said tape winding bodies comprising a pair of engaging pawls each pivotally supported at one end thereof and having a free and urged in a direction to engage a gear portion formed on a flange of respective one of said tape winding bodies, and a pair of rotatable body portions each having an abutment portion and an operating portion, both of which extend from said rotatable body portion radially of said body portion, said abutment portion being engageable with a respective one of said engaging pawls intermediate the length of said engaging pawl so as to move said engaging pawls out of engagement with said gear portions, a brake release insertion member being insertable into said cassette through a hole through a wall of said cassette so as to engage each of said operating portions to move said abutment portions, said rotatable body portions being urged in such directions as to hold said operating portions in contact with each other to close said hole, each abutment portion urging a respective one of said engaging pawls to move said engaging pawls out of engagement with said gear portions when said operating portions are moved away from each other, said operating portions not moving with movement of said engaging pawls.

2. The magnetic tape cassette according to claim 1, in which said engaging pawls are positioned normally out of contact with said abutment portions to provide a slight space therebetween when said operating portions are in contact with each other to close said hole.

* * * * *